United States Patent Office 3,433,740
Patented Mar. 18, 1969

3,433,740
WELL FLUID ADDITIVE AND METHOD OF MAKING THE SAME
Arthur L. Armentrout, 455 E. Ocean Blvd., Long Beach, Calif. 90802
No Drawing. Continuation-in-part of application Ser. No. 502,507, Oct. 22, 1965. This application Jan. 18, 1968, Ser. No. 698,735
U.S. Cl. 252—8.5         10 Claims
Int. Cl. C09; C09k 3/00

ABSTRACT OF THE DISCLOSURE

A combination weighting, fracturing and propping aggregate additive for well fluids comprising, a plurality of commingled groups of granulate mineral material, the granules of each group being substantially the same size, each granule having Krumbein indices of sphericity and roundness greater than 0.6, a specific gravity of 2.7 or greater and a Moh's hardness in excess of 3, the granule of each group of granules being approximately twice the size of the granules of the next smaller size group, the volume of each group of granules being approximately equal to the volume of every other group of granules, and having a bulk density of over 160 pounds per cubic foot, the major dimensions of the smallest granules being less than one micron, and the major dimensions of the largest granules not exceeding 16,384 microns, preferably a predetermined portion of the granules are established of acid soluble material and all other granules are established of acid resistant material.

---

This application is a continuation-in-part of my Letters Patent No. 3,219,111, issued Nov. 23, 1965, entitled "Method for Stopping Loss of Circulating Fluid in Well Bores" and of my copending application Ser. No. 502,507 filed Oct. 22, 1965, now abandoned, entitled "Well Fluid Additive and Method of Making the Same."

In the art of drilling wells, fluid is circulated through the well structure to lubricate the drilling bit, drill pipe and the well structure, to remove the cuttings from the bottom of the well bore and to assist, hydraulically, to establish and maintain the well bore walls.

Frequently, a well bore intersects a formation in which water, oil or gas is present, and is under greater pressure than the circulating fluid at the formation face and which enters the well structure to displace the circulating fluid therefrom. To prevent such displacement of circulating fluid, the art has sought to overcome the water, oil or gas pressures by weighting the fluid with granular material, such as iron oxide or other material which has a high specific gravity.

Iron oxide and other such materials that are presently employed by the prior art consist of particles that are mostly of the same size. It has been established that such materials, of a uniform size, will pass fluid readily.

About the only specification for such materials, provided by the prior art, is that 100% of the specified kind of material must pass through a screen of a given size opening, such as 325 mesh (.0017″) (44 microns) or 200 mesh (.0029″) (74 microns), etc.

When the circulating fluid is sufficiently weighted to overcome the gas, oil and/or water pressures which tend to displace the fluid from the well, normal drilling operations can be continued.

In practice, however, it is seldom if ever that an absolute or true balance can be obtained between the drilling fluid pressure and the water, oil or gas pressures which tend to displace the fluid from the well. Accordingly, it is necessary to establish an overwhelming pressure on the circulating fluid. As a result, the circulating fluid backs the oil, gas or water back into its carrier formation and is, itself, lost in the formation.

To overcome such loss of circulating fluid, lost circulation material is added to the fluid, which material is granular or particulate in nature and is adapted to enter or to overlie and plug or stop-up the cracks, crevices, fissures and the like in the formation and through which the circulating fluid is escaping.

Ordinary lost circulation material is rather coarse. That is, it is made up of rather large particles. Accordingly, while such material may be effective to stop or plug large openings in the formation, it is not effective to plug or seal fine or small openings.

Since oil, gas and water bearing formations are frequently replete with extremely fine or small openings and the like, it is frequent that the loss of circulating fluid, under the circumstances set forth above, cannot be stopped and its rate of loss must be controlled by careful control of the weight of the fluid and the pump pressure applied thereto.

It is an object of this invention to provide a new and improved combination lost circulation and weight material for drilling fluids, which material is effective to increase the weight of the fluid and is effective to enter into and to establish a plug or seal in small openings and the like in a formation into which the fluid would otherwise escape.

Also, in the art of bringing oil and gas wells into production, it is common practice to fracture the production formation about the well bore so as to induce the free flow of oil and gas into the well structure.

Fracturing operations are carried out after the lower end of the well casing is cemented in place and sealed in the well bore, above the lower end thereof, and usually, immediately above the production formation. Fracturing the production formation is accomplished by introducing the circulating fluid, to which a suitable granulate propping material, such as sand, is added, into the well structure at sufficiently high pressure and at such a rate to cause it to be forced into the formation.

The fluid entering the smallest of cracks and fissures in the formation causes them to extend and expand. As the fluid enters and fractures the formation, the propping agent is carried into the fractures, provided the fractures or cracks in the formation have been expanded large enough to enable the propping agent to enter.

If the propping agent has entered the temporarily enlarged fractures or cracks, when the fluid pressure is released, the propping agent left in the fractures serves to prop the formation and maintain the fractures open for subsequent flow of production fluid and/or gas therethrough, into the well bore.

It will be apparent that if the propping agent does not enter the fractures, when the fluid pressure is released, the cracks and fractures close and prevent the production fluid from entering the well bore. This explains why many wells have been fractured with no, or very little, improvement. In such situations, the large propping material, #6 mesh (.131″) to #20 mesh (.0328″), which is the range of sizes commonly employed by the prior art, simply could not enter the fractures.

It has been determined that the selection and use of such a propping agent, this is, a volume of sand of a single, particulate size and without reference to or consideration of the configuration of the particles, is not effective or dependable.

An object of my invention is to provide a novel and improved combination lost circulation, weighting and propping agent for use in fracturing operations.

It is another object of the present invention to provide a classified aggregate for well circulating fluid to weight the fluid and/or prevent the loss of circulating fluid and/or to facilitate fracturing operations, the specific gravity of which is from three to five or more times greater than water and the size of which is sufficiently small so it can enter very small cracks and fractures of .001″ (25 microns approx.) or .002″ (50 microns approx.) or even smaller.

Further, it is an object to provide such a material which is such that it can be easily and readily carried, in suspension, by engineered well circulating fluid having high indices of shear.

A further object of this invention is to provide a material of the character referred to which is an aggregate made up of particles having substantially uniform high indices of sphericity and roundness and which are free of sharp, thin, weak or fragile points, projections, edges and the like, whereby said particles will freely enter fractures and the like in a production formation to bridge and seal therein so as to prevent the loss of circulating fluid or to bridge and seal therein to establish a bridging plug against which fluid pressure can be exerted and transmitted into and through the formation to fracture said formation.

It is still another object of this invention to provide a material of the character referred to wherein the granules are sufficiently spherical and round to assure high mobility and fluidity when in suspension in a carrier fluid and which are sufficiently out of round and irregular in shape to resist movement and displacement when brought and urged into direct bearing contact with other structure, and to have hydro-dynamic characteristics which makes the material such that it will be readily carried by and will not tend to immediately settle in the body of moving drilling or circulating fluid to which it is added.

Yet another object of my invention is to provide a material of the character referred to which is substantially non-compressible, having a Moh hardness of three or more and which is possessed with sufficient strength to withstand all circulating fluid pressures that may be applied thereto and which has sufficient strength to prop or hold and maintain fractures in a production formation, in which fractures the material is lodged, apart and open.

It is an object of this invention to provide a material of the character referred to and for the purposes set forth above which is made up of predetermined volumetric portions of graded or sized particles or granules, whereby the normal pattern and/or combination of granules held in suspension and carried by a volume of circulating fluid is such that it will establish an immediate, substantially complete bridge upon stopping of the foremost or leading larger granules and upon the advancement of the next smaller granules into engagement therewith.

It is an object of this invention to provide a material of the character referred to above in which a predetermined portion, for example about 50%, of the granules are established of an acid soluble material, such as calcite, and the remainder of the granules are established of a non-acid soluble material, such as barium sulphate, whereby a predetermined portion of the material can be removed from within a fractured formation by circulating a fluid containing an acid, such as hydrochloric acid, into contact with the material.

A fractured formation using a mixture of the above material can be acid treated so as to remove the calcite and leave the barium sulphate granules as the propping agent; thereby destroying any seal established by the material and opening up large channels for the oil and gas to flow into and through the well bore.

The material or circulating fluid additive that I provide is a granular or particulate aggregate of a hard, strong and heavy material, such as barium sulphate, the specific gravity of which is 4.6 and the Moh hardness of which is 3.5; limestone or calcite, the specific gravity of which is 2.7 and the Moh hardness of which is 3; iron pyrite, the specific gravity of which is 5.02 and the Moh hardness of which is 6.5; iron oxide, the specific gravity of which is 5.26 and the Moh hardness of which is 6.5; or any other suitable hard, strong and heavy mineral material, whether natural, manufactured or reconstituted.

In practice, granules of metal, such as stainless steel, or of oxides, such as fused aluminum oxide, can be used without departing from the spirit of the invention.

For the purpose of illustration, I will restrict the following disclosure to two suitable materials, i.e., calcite and barium sulphate, both of which materials are suitable for carrying out the present invention.

The crystallography of calcite is extremely complex, there being over three hundred different forms, all of which are replete with sharp edges, corners, points and the like.

For further information concerning the crystallography of calcite, reference is made to Dana's Manual of Mineralogy, sixteenth edition, revised by Hurlbut, published by John Wiley and Sons, 1952, pp. 264 and 268.

In carrying out my invention, the calcite is crushed by a suitable milling operation and to an extent that the material is reduced to granules the size of which range from less than one micron to about sixteen thousand three hundred eighty-four microns, or about .655 inch.

After the calcite is crushed, it is classified and separated as to size and in accordance with the following chart, wherein fifteen typical and preferred sequentially numbered sizes of granules are indicated:

| Number | Micron sizes, basic aggregate |
| --- | --- |
| 1 | 1 |
| 2 | 2 |
| 3 | 4 |
| 4 | 8 |
| 5 | 16 |
| 6 | 32 |
| 7 | 64 |
| 8 | 128 |

| | Micron sizes |
| --- | --- |
| 9 | 256 |
| 10 | 512 |
| 11 | 1024 |
| 12 | 2048 |
| 13 | 4096 |
| 14 | 8192 |
| 15 | 16,384 |

Classification can be carried out by one or more of several suitable methods or processes which are in wide use and which ordinarily involve the use of air, water and screens. In the water process, the material is deposited in a stream of water, the volume and rate of flow of which is controlled.

As the stream of water carries the material lineally, the particles of different sizes, settle out at different points.

The above water method for classifying material is suitable for separating and classifying granules from number 8 or 128 microns down to number 2 or 1 microns. Granules larger than 128 microns can be separated as to size with mechanical screens and the like.

It will be apparent from the above chart that each successive size of granule is twice the size of the preceding size of granule. This relationship of granule sizes is highly important as the interstices and voids established by a group of granules of one, larger size of granules arranged in bridging contact with each other and with other still larger granules are such and sufficiently small that they will not freely pass or permit the entrance of the next smaller size granules.

For example, the interstices and voids established by sixteen micron sized granules arranged in bridging contact with each other and in contact with larger sized granules will not receive, accommodate or pass eight micron size granules.

On the other hand, interstices and voids established by sixteen micron size granules alone will receive, accommodate or pass four micron sized granules.

Accordingly, the relationship that each successive size of granules be approximately twice the size of the next smaller size granules is highly important and results in an aggregate engineered and designed to establish a bridge structure free of unnecessary, excessive and interfering granules and a bridge structure which is not such that certain of the smaller size granules are free to flow and migrate through the bridge established.

Upon crushing the calcite, it breaks along its natural lines of cleavage, accordingly, the resulting granules are replete with thin, weak and sharp edges and corners. While the crushed and classified material could be used without further treatment, it is preferred, in carrying out this invention, that it be subjected to a process or treatment where it is ground or milled to remove the sharp corners and edges.

This grinding or milling treatment is effected by tumbling the granules in a drum with and in the presence of aluminum oxide pellets.

The grinding operation can and is, in the preferred carrying out of the invention, continued until the granules achieve a Krumbein sphericity of from .5 to .7 (average .6) and a Krumbein roundness of from .8 to .9. (This measure of the granular nature of particles is set forth and illustrated in "Stratigraphy and Sedimentation," by W. C. Krumbein and L. L. Sloss, 1950 edition, published by W. H. Freeman and Company, p. 81.)

While establishing the granules with such high indices of roundness and sphericity is extremely desirable, it is not imperative. It is sufficient for satisfactory results to simply remove the thin, weak and fragile parts and/or portions of the granules.

The ground and dressed granules can be likened to ovoid or botryoidal shaped granules free of sharp, thin, and therefore structurally weak corners, edges, points and the like, and free of edges, corners, points and the like which would interfere or prevent the granules from moving and migrating freely when mixed or added to circulating fluid and circulated through a well structure. Still further, when the granules are stopped in a well structure with which they are related, to establish load supporting members, they are free of weak and fragile points, edges and the like, which would otherwise render them unstable or undependable load supporting members.

Subsequent to grinding these materials, each classification can, if desired, be reclassified, particularly for the purpose of removing or eliminating the resulting extremely small or sub-micron particles or granules.

It will be apparent that subsequent to the grinding, the particle sizes are slightly less, that is, the granules are reduced somewhat in size and the smallest is sub-micron in size. This reduction in size does not affect the invention, since the change is rather slight and is substantially uniform throughout all of the various sizes of granules.

Subsequent to the last, above-considered step in producing my new material, equal volumes of several different sizes of granules, progressing uniformly from the smallest size, are combined and mingled to establish the finished product or aggregate additive.

It is to be understood that other material employed, such as barium sulphate, are classified and are preferably treated in the same manner as set forth above.

In practice, five or more different sizes of granules are combined. For example, and as set forth in the above chart, equal volumes of 1, 2. 4, 8, 16, 32, 64 and 128 micron size granules establish a basic aggregate, which aggregate is extremely effective as a weighting agent and/or propping additive.

To the above basic aggregate can be added equal volumes of any desired number of the other size granules, progressing from 128 micron size up to 16,384 micron size.

It will be apparent that an aggregate additive as provided by this invention and including the larger size granules is particularly suitable for use in fracturing operations, or in operations where circulating fluid is escaping into and through cracks or fractures in a formation which are of such size and extent that the smaller particles will not bridge and stop therein, and where it is desired to stop the loss of circulating fluid.

While I call for equal volumes of each size of granules, it is to be understood that, in practice, close tolerance of such proportioning need not be adhered to and that the volume of each size of granules may vary from the volume of each of the other size granules. For example, a variation in volume of different sizes of granules of ten percent, plus or minus, is possible without adversely affecting the proper functioning of the material.

The material that I provide in the instant invention distinguishes from the loss circulation material disclosed and claimed in my above-identified Patent 3,219,111 in the following respect:

The aggregate in Patent 3,219,111 is classified as to size and varies from the smallest size of .0021 inch and up, whereas the granules in the instant invention vary from minus one micron size up to 16,384 microns, or .655 inch. The granules in the aggregate provided in Patent 3,219,111 are established of expanded marine shale and are light, relatively buoyant particles or granules having a bulk density of from 40 pounds to 70 pounds per cubic foot, whereas the granules in the material provided by the instant invention are crushed and polished or ground, heavy particles having a bulk density of from 160 pounds (calcite) to 270 pounds (barium sulphate) per cubic foot or more.

The expanded marine shale employed in the material provided in Patent 3,219,111 is a cellular material and is such that it cannot be provided in micron sizes. Further, the material provided in that patent is light and buoyant and cannot be employed as a weighting agent.

When used, my new aggregate additive is added to the drilling fluid at the top of the well in desired volume and is pumped and circulated down, into and through the well structure. The material, when thus added to the drilling fluid and introduced into the well, weights the fluid to effectively overcome gas, oil and/or water pressures encountered within the well.

Further, should the circulating fluid be escaping into and through a porous or fractured formation traversed by the well bore, the granules will enter the smallest or cracks and fissures in the formation, bridge therein and seal the formation against further loss of circulating fluid.

When my new material is employed in fracturing operations, it is added to the circulating fluid and is pumped down the well and into the portion of the well bore extending into or through the production formation.

The well is then closed at the top and pressure is increased on the drilling fluid to an extent and until it fractures the formation or until it forces its way into and opens up existing fractures in the formation. When the circulating fluid is thus forced into and opens the formation, the aggregate is carried into the fractures thereby.

As the material is advanced into the fractures in the formation, it tends to bridge and build up fluid tight plugs or seals in the formation. When such bridged plug or seal is established, the fluid pressure acting upon the plug is increased until the plug is blown or displaced. When this takes place, the fractures are opened wider and the aggregate is forced further outwardly from the well bore until it once again establishes a similar bridging plug. When this takes place, the second or subsequent bridging plug is again blown out by fluid pressure and the fracturing operation is continued and advanced, in a similar manner, as desired.

Each time a bridging plug is established in the formation by the smaller granules, and the fractures in the formation are opened up, the larger granules lodge and bridge in the fractures thus opened to prop and maintain the fractures opened.

After the formation has been fractured to the desired extent, fluid pressure is relieved therefrom and the aggregate is left in the fractures in the formation to prop and hold them open.

In practice, when it is desired to establish or provide a fracturing material that can be partially removed, after the fracturing pressure has been relieved, a mixture or blend of about fifty percent (50%) more or less, of an aggregate of acid soluble material, such as calcite, and about fifty percent (50%), more or less, of an aggregate of non-acid soluble material, such as barium sulphate, is introduced into the well and the same fracturing operation as set forth above is completed. Subsequent to completion of the fracturing operation to the above-noted extent, a suitable acid, such as hydrochloric, is added to the circulating fluid and is pumped into the well and into intimate contact with the lodged and set aggregate in the fractured formation. The acid reacts with the granules of soluble material to reduce or, in effect, dissolve them, leaving only the non-acid soluble granules in the formation to prop it. Thus, the bridging structure in the fractured and opened formation is opened for free flow of oil and/or gas therethrough.

In practice, the proportions of acid soluble and non-acid soluble material must be engineered so that upon removal of the acid soluble material, the propping structure will not be so weakened and reduced as to result in undesired and/or excessive collapsing of the bridging structure and closing up of the opened formation. Accordingly, it may be necessary that no more than 10% or 15% of the material can be acid soluble. In any event, no more than 50% of the granules need or should be established of acid soluble material.

Still further, it is preferred, in certain circumstances and under certain conditions that a predetermined portion of the smaller size granules be of acid soluble material and all others of acid resistant material. For example, 50% of the granules in groups 1 through 4 can be acid soluble and the remainder of the granules can be non-acid soluble.

With such an aggregate, removal of the acid soluble material opens the bridging structure for free flow of fluids therethrough, but the basic bridging and propping structure established by the larger sized granules is undisturbed.

When referring to acid soluble material, reference is made to those materials which meet the specifications and requirements for materials suitable for carrying out the weighting, sealing and propping of fracturing functions noted above and materials which are not adversely affected by the environments normally encountered in oil wells, but which are readily reactive to certain predetermined acids.

Further, when referring to non-acid soluble materials, reference is made to materials which, for the purpose of carrying out this invention, can be considered non-reactive in the presence of acids of the type or kind which would be employed in well drilling operations and/or in the strength of acid which would be encountered in well drilling operations.

A material which has such a low reaction to the acid employed, in the strength to be encountered, that no significant or detrimental reduction of that material will take place during that period of time which is required to remove the acid soluble material employed and during a sufficient added period of time during which flow of production through the bridging structure will purge the acid therefrom is, in this invention, to be considered non-acid soluble or acid resistant.

The most desirable and preferred forms of acid soluble materials for carrying out this invention are in the limestone family and include limestone, calcite, Dolomite (which is made up of magnesium carbonate and calcium carbonate) and calcium carbonate.

Typical of non-acid soluble or acid resistant materials suitable for use in carrying out the invention are barium sulphate, natural quartz, manufactured quartz glass products, stainless steel, fused aluminum oxide and the like.

Typical of the acids suitable for carrying out the invention are hydrochloric and ortho phosphoric acids. These acids have a high reaction with above noted acid soluble materials and are such that a solution of such acids sufficiently mild or weak so as not to adversely affect the overall structure and completely reduce the soluble materials, in the form they are presented, in a very short period of time, for example, in less than twelve hours.

In practice, special inhibited acid compounds are provided for use in wells, which compounds are such that they will not attack the well casings and the like, but will only react on or with certain predetermined materials. Such an acid compound, suitable for use in carrying out the present invention is an inhibited ortho phosphoric acid disclosed in Patent No. 3,095,379, manufactured by Oil Well Heating Systems, Inc., of Los Angeles, Calif., and sold under the name CS–100. CS–100 is particularly suitable for rapidly and efficiently removing calcium carbonate granules from a bridged mass of my aggregate additive and can be used at considerable strength without adverse effects to the remainder of the well structure.

Having described only a typical preferred form and application of my invention, I do not wish to be limited or restricted to the specific details herein set forth, but wish to reserve to myself any modifications or variations that may appear to those skilled in the art and which fall within the scope of the following claims.

Having described my invention, I claim:

1. A combination weighting, fracturing and propping, water insoluble aggregate additive for well fluids comprising, a plurality of commingled groups of granulate water insoluble mineral material, the granules of each group being substantially the same size, each granule having Krumbein indices of sphericity and roundness greater than 0.6, a specific gravity of 2.7 or greater and a Moh's hardness in excess of 3, the granules of each gorup of granules being approximately twice the size of the granules of the next smaller size group, the volume of each group of granules being approximately equal to the volume of every other group of granules, and having a bulk density of over 160 pounds per cubic foot, the major dimensions of the smallest granules being less than one micron and the major dimensions of the largest granules not exceeding 16,384 microns.

2. A combination weighting, fracturing and propping, water insoluble aggregate additive for well fluids comprising, a plurality of commingled groups of granulate water insoluble mineral material, the granules being ovoid in form and free of sharp corners and edges, the major dimensions of the granules of one group being approximately one micron, the granules of all other groups being larger, the granules of each successive larger group being approximately twice the size of the granules of the preceding group, the major dimension of the largest group not greater than 16,384 microns, the volume of each group being substantially equal to every other group, and having a bulk density of over 160 pounds per cubic foot.

3. An aggregate additive as set forth in claim 2 wherein, a predetermined portion of the granules of each group is established of material resistant to hydrochloric and phosphoric acids, the remaining portion of said granules being established of material soluble in hydrochloric and phosphoric acids, whereby a predetermined portion of the materials lodged in an earth formation can be selectively removed therefrom by subjecting thte material to an acid bath.

4. An aggregate additive as set forth in claim 2 wherein, the granules have a specific gravity of 2.7 or greater and a Moh's hardness in excess of 3.

5. An aggregate additive as set forth in claim 2 wherein, the granules have a specific gravity of 2.7 or greater and a Moh's hardness in excess of 3, a predetermined portion of the granules of each group being established of material resistant to hydrochloric and phosphoric acids, the remaining portion of said granules being established of material soluble in hydrochloric and phosphoric acids, whereby a predetermined portion of thte material lodged in an earth formation can be selectively removed therefrom by subjecting the material to an acid bath.

6. An aggregate additive as set forth in claim 2 wherein, each granule has Krumbein indices of sphericity and roundness greater than 0.6.

7. An aggregate additive as set forth in claim 2 wherein, each granule has Krumbein indices of sphericity and roundness greater than 0.6, a predetermined portion of the granules of each group being established of material resistant to hydrochloric and phosphoric acids, the remaining portion of said granules being established of material soluble in hydrochloric and phosphoric acids, whereby a predetermined portion of the material lodged in an earth formation can be selectively removed therefrom by subjecting thet material to an acid bath.

8. An aggregate additive as set forth in claim 2 wherein, each granule has Krumbein indices of sphericity and roundness greater than 0.6, a predetermined portion of the granules of each group being established of material resistant to hydrochloric and phosphoric acids, the remaining portion of said granules being established of material soluble in hydrochloric and phosphoric acids, whereby a predetermined portion of the material lodged in an earth formation can be selectively removed therefrom by subjecting the material to an acid bath, the granules having a specific gravity of 2.7 or greater and a Moh's hardness in excess of 3.

9. An aggregate additive as set forth in claim 2 wherein, the granules have a specific gravity of 2.7 or greater and a Moh's hardness in excess of 3.

10. An aggregate additive as set forth in claim 2 wherein, each granule has Krumbein indices of sphericity and roundness greater than 0.6, a predetermined portion of the granules of a predetermined number of the groups of the smallest size granules being established of material resistant to hydrochloric and phosphoric acids, the remaining portion of said granules being established of material soluble in hydrochloric and phosphoric acids, whereby a predetermined portion of the material lodged in an earth formation can be selectively removed therefrom by subjecting the material to an acid bath, the granules having a specific gravity of 2.7 of greater and a Moh's hardness in excess of 3.

References Cited

UNITED STATES PATENTS

| | | |
|---|---|---|
| 1,575,945 | 3/1926 | Stroud. |
| 2,124,495 | 7/1938 | Miller. |
| 2,648,522 | 8/1953 | Armentrout. |
| 2,943,679 | 7/1960 | Scott et al. |
| 3,046,222 | 7/1962 | Phansalkar et al. |
| 3,219,111 | 11/1965 | Armentrout et al. |

OTHER REFERENCES

Rogers, Composition and Properties of Oil Well Drilling Fluids, first edition, pub 1948 by Gulf Pub. Co., of Houston, Tex., pp. 172–173, 320 and 321.

HERBERT B. GUYNN, *Primary Examiner.*

U.S. Cl. X.R.

252—8.55; 175—72; 166—42